United States Patent
Aggarwal et al.

(10) Patent No.: US 10,860,978 B1
(45) Date of Patent: Dec. 8, 2020

(54) NONDISRUPTIVE WORKSPACE REPRESENTATION DEPLOYMENT FOR INVENTORY SYSTEMS

(71) Applicant: Amazon Technologies, Inc., Seattle, WA (US)

(72) Inventors: Aayush Aggarwal, Medford, MA (US); Michael T. Barbehenn, North Reading, NH (US); James Plumley, Pelham, NH (US); Le Zou, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 357 days.

(21) Appl. No.: 15/796,491

(22) Filed: Oct. 27, 2017

(51) Int. Cl.
| | | |
|---|---|---|
| *G06F 7/00* | (2006.01) | |
| *G06D 1/00* | (2006.01) | |
| *G06D 1/02* | (2006.01) | |
| *G06Q 10/08* | (2012.01) | |
| *G06K 7/10* | (2006.01) | |
| *G05B 19/418* | (2006.01) | |

(52) U.S. Cl.
CPC ..... *G06Q 10/0875* (2013.01); *G05B 19/4183* (2013.01); *G05B 19/41875* (2013.01); *G05B 19/41895* (2013.01)

(58) Field of Classification Search
CPC .... G05D 1/0088; G06Q 10/087; G06Q 10/08; B66F 9/063
See application file for complete search history.

(56) References Cited

U.S. PATENT DOCUMENTS

| | | | | |
|---|---|---|---|---|
| 8,280,547 B2* | 10/2012 | D'Andrea | ............... | B66F 9/063 |
| | | | | 700/214 |
| 9,087,314 B2* | 7/2015 | Hoffman | .......... | G05B 19/41895 |
| 9,452,883 B1* | 9/2016 | Wurman | ............... | G05D 1/0287 |
| 9,818,002 B1* | 11/2017 | Yunes | ................... | G06Q 10/087 |
| 9,953,287 B1* | 4/2018 | McDonald, Jr. | .... | G06Q 10/0832 |
| 10,217,074 B1* | 2/2019 | Stallman | ................ | G06Q 10/08 |
| 10,409,281 B1* | 9/2019 | Garrett | ................. | G05D 1/0297 |
| 2012/0143427 A1* | 6/2012 | Hoffman | ................ | G06Q 10/08 |
| | | | | 701/23 |

(Continued)

OTHER PUBLICATIONS

U.S. Appl. No. 15/691,316, U.S. Patent Application, filed Aug. 30, 2017, Titled: Rapid Workspace Representation Deployment for Inventory Systems.

*Primary Examiner* — Talia F Crawley
(74) *Attorney, Agent, or Firm* — Kilpatrick Townsend & Stockton LLP

(57) ABSTRACT

Systems and methods described herein pertain to maintaining a virtual representation of a workspace in a material handling system and updating the virtual representation without downtime. Methods described include maintaining an initial virtual representation of a material handling grid, receiving an updated virtual representation, and generating and implementing an intermediate virtual representation that does not conflict with the initial virtual representation. Methods further include, upon determining that the intermediate virtual representation is performing without conflicts, deploying the updated virtual representation to replace the intermediate virtual representation without halting operations in the workspace. Multiple intermediate virtual representations can be generated to allow for complex changes, and the deployments performed in series.

20 Claims, 14 Drawing Sheets

(56) References Cited

U.S. PATENT DOCUMENTS

2014/0129393 A1* 5/2014 Soon-Shiong ..... G06K 9/00624
705/27.2
2017/0193406 A1* 7/2017 Berman ............. G06Q 10/1095

* cited by examiner

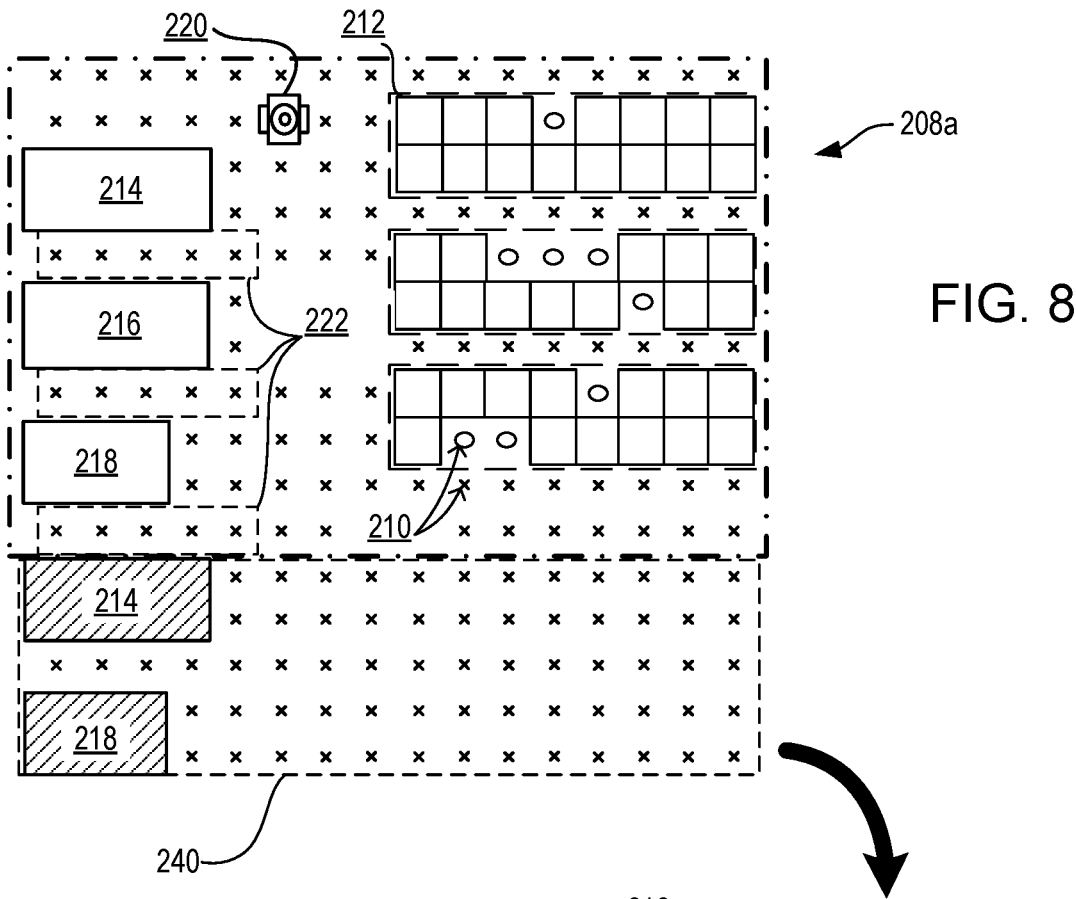
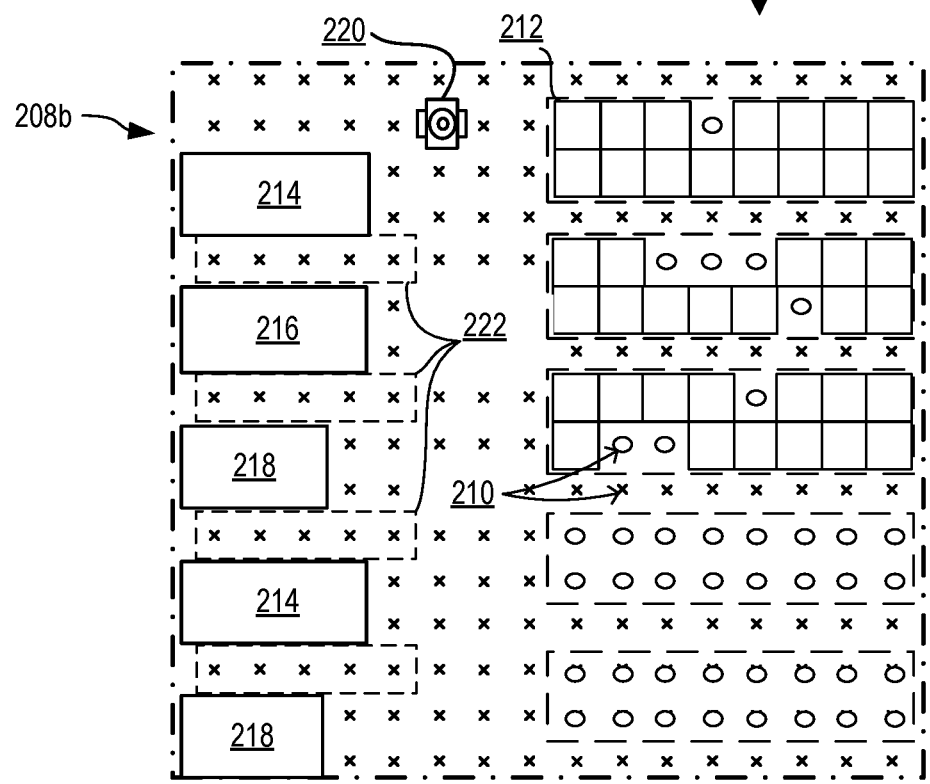
FIG. 8

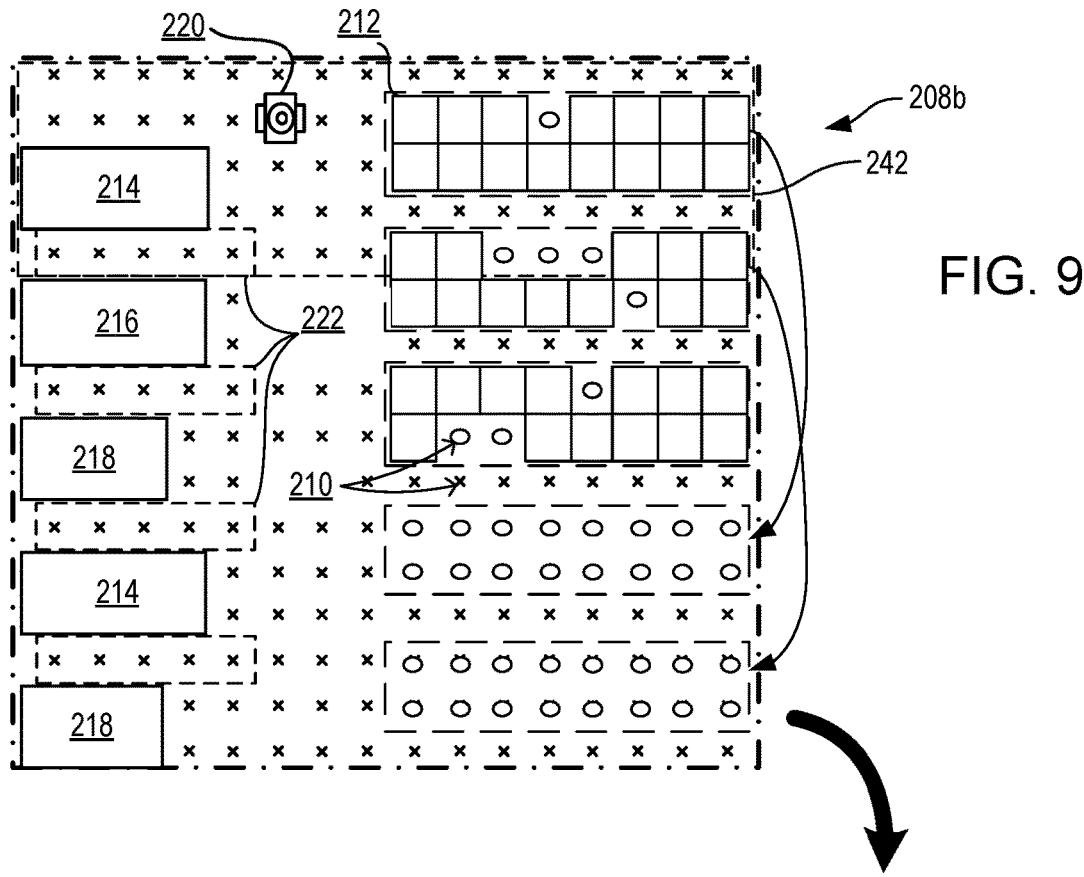
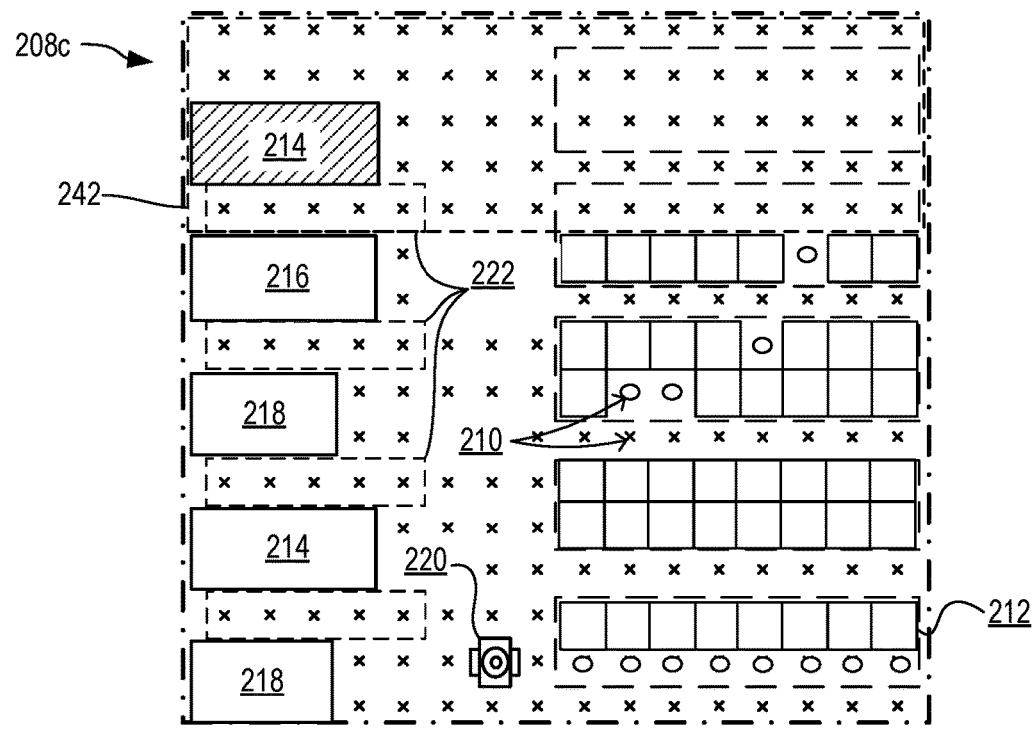
FIG. 9

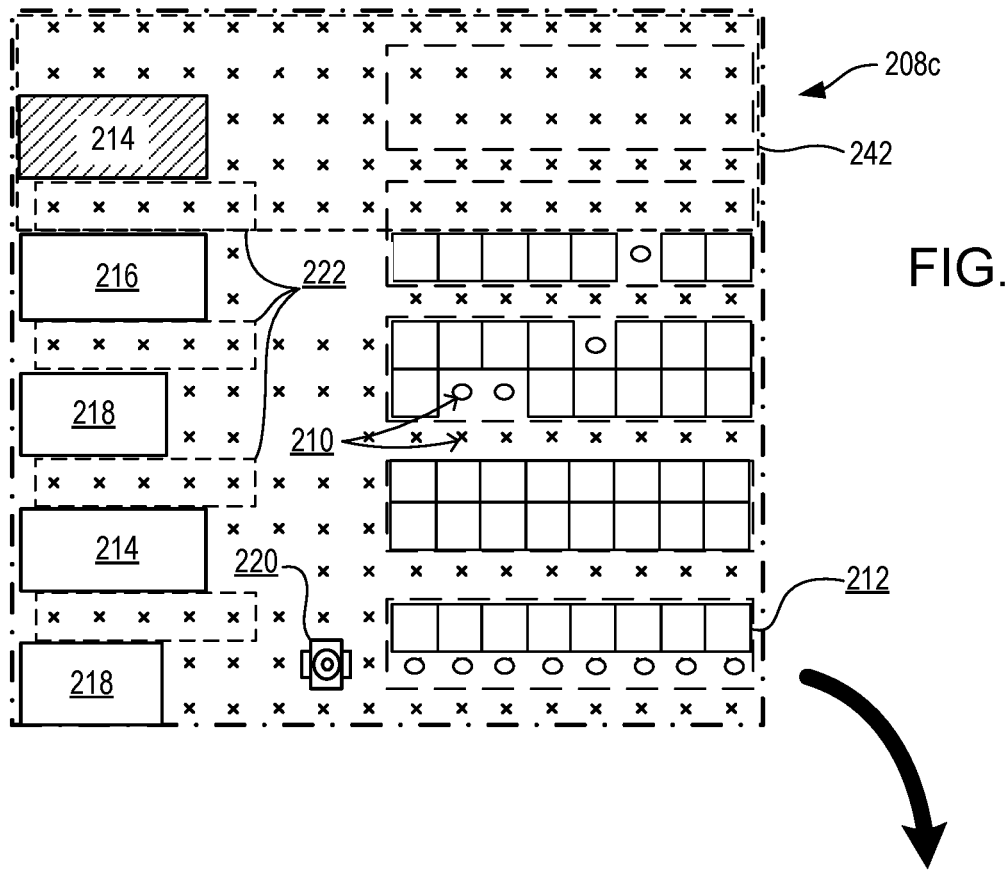
FIG. 10
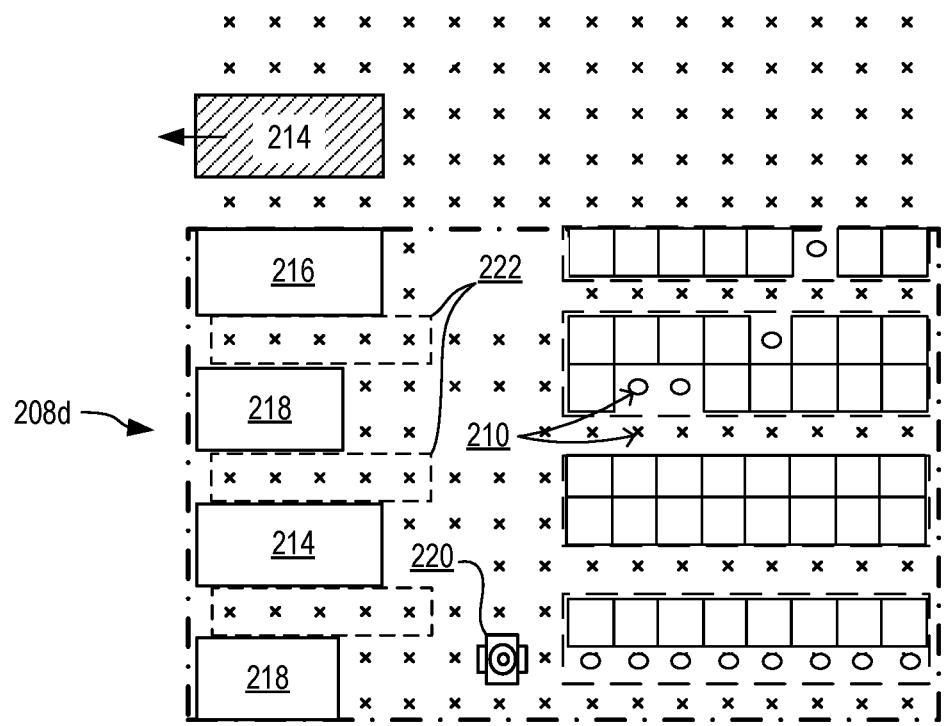

NONDISRUPTIVE WORKSPACE REPRESENTATION DEPLOYMENT FOR INVENTORY SYSTEMS

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, sorting, retrieving, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput. In particular, as inventory systems evolve in capacity and complexity, the challenges of adapting an inventory system to modifications also increase.

BRIEF DESCRIPTION OF THE DRAWINGS

Various embodiments in accordance with the present disclosure will be described with reference to the drawings, in which:

FIGS. 8-10 are simplified schematic diagrams illustrating a first example of an update to a virtual representation of a workspace as applied to the inventory system of FIG. 1;

DETAILED DESCRIPTION

Figure 1:
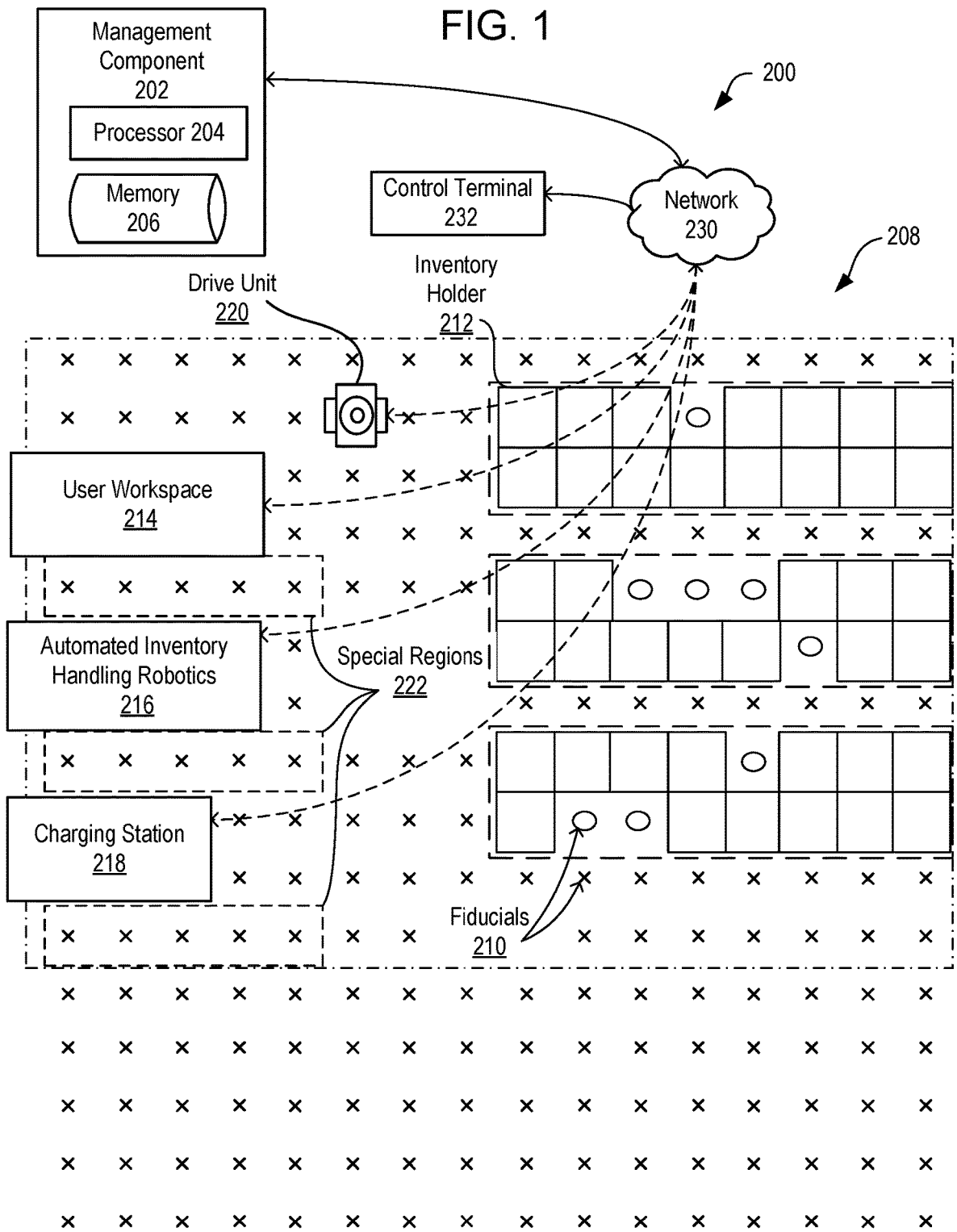
FIG. 1 is a simplified schematic diagram illustrating an example inventory system, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Embodiments described herein can apply to any suitable inventory system, including but not limited to mail order warehouses, supply chain distribution centers, airport luggage systems, custom-order manufacturing facilities, and the like. As used herein, "inventory system" refers to any such system for categorizing, sorting, storing, and/or redistributing inventory using at least partly automated means.

Inventory systems can enhance throughput by efficiently using space and by employing automation, including robotic means to lift, transport, and place inventory. In order to enable the seamless processing of inventory by said robotics, modern inventory systems track the positions and status of multiple robotic systems in order to control how they interact with one another and how they occupy and move through space. One way to enable such processing is by maintaining a virtual representation of an inventory system that corresponds to the physical inventory system, and which governs how the inventory system controls the robotic elements within the physical inventory system. Such inventory systems can include a workspace, which may be presented as a material handling grid, with a concomitant virtual workspace and virtual material handling grid.

One significant drawback in such automation has been that, as the physical systems and their representative virtual systems grow more complex, the task of introducing changes to the physical system has also grown more complex. For example, a physical change to the position of any subsystem or obstacle within a physical inventory system must correspond to an update in the virtual inventory system. Furthermore, aspects of the inventory system's behavior may also be controlled by the virtual inventory system, without visible changes to the physical inventory system. In some cases, many disparate software modules have to interact with one another to manage an inventory system; creating the possibility of conflicts or errors that could be generated inadvertently when a change is implemented. These drawbacks compete functionally with advantages of increased automation, workspace complexity, and compactness.

Another challenge in such automation is that, as inventory systems grow more complex and employ more automated components, the impact of downtime in any portion of the inventory system can cascade into broad productivity losses across the inventory system. The same economies of scale that encourage the use of large, automated systems can result in sensitivity to temporary disruption at potentially high economic cost. The importance of perfect synchronization between automated components has thus far required at least brief downtime during system changes in order to prevent collisions between automated units, (e.g. drive units, robotic lifters, and the like,) and to ensure the safety of operators. Thus, there is interest in further innovation to mitigate the amount of downtime in inventory systems.

Embodiments herein are directed to an inventory system potentially having multiple inventory holders, drive units for moving the inventory holders, and robotic systems for handling inventory in conjunction with a virtual inventory system that monitors and controls the positions and activities of components of the inventory system. Specific embodiments relate to methods and systems for performing deployment of changes to the inventory system by updating a virtual representation of the inventory system, potentially in tandem with physical changes to components within the inventory systems, and/or to change the way components interact with each other or with the space within the inventory system. In particular, embodiments described herein relate to methods and systems for performing such updates while minimizing disruption to the inventory system generally, and in some embodiments, without pausing inventory handling operations.

FIG. 1 illustrates an example system 200 that utilizes a material handling grid 208 in an inventory facility, in accordance with some embodiments. Aspects of the system 200 are directed by a controller or management component 202, which includes a processor and memory 204, 206. Specific attributes of the management component 202, associated modules, and processes are discussed below with greater detail with reference to FIGS. 7-14. The management component 202 can communicate with other system components via a network 230, such as a wireless network. The system 200 can be used to manage inventory items in the context of the workspace 208, which is a space for moving and/or sorting inventory and inventory holders defined by positions 210 on the material handling grid 208. In general, the positions 210 in the material handling grid 208 are marked out by fiducial markings that provide unmanned drive units 220 and potentially other automated robotics with points of preference for navigating the material handling grid 208. It will be understood that the principles described herein may apply to systems that employ any other suitable form of material handling grid, including grids that may use alternative means to locate resources in an inventory system other than fiducial markings.

The positions 210 correspond with virtual grid positions of a virtual workspace maintained by the management component 202 and managed in parallel with the material handling grid 208. In some embodiments, the material handling grid 208 can include a laid-out set of grid positions, which may include machine-readable fiducial markings. Generally, each grid position will be uniform and sized to accommodate inventory system resources, such as but not limited to drive units 220 and inventory holders 212 as shown. The physical grid positions correspond to grid positions in the virtual representation of the workspace, so that the management component 202 can track positions and actions of resources as they move about the material handling grid 208. Where fiducial markings are used, such markings can include machine-readable indicia for use by drive units 220, or other system resources, to identify their current position in the inventory system. In some embodiments, resources in the material handling grid 208 can use the fiducial markings as guides for transiting within the workspace, as will be described in greater detail with reference to FIG. 2 below.

The material handling grid 208 does not necessarily encompass the entire available floor space of an inventory management system, which can be adjusted in size as needed to include more floor space, or less, or to include or exclude physical elements. As shown, an arbitrary number of positions 210 may be either included or excluded from the material handling grid 208 at any one time, with bounds of the material handling grid being maintained as data included in the virtual representation thereof. A virtual representation of the workspace can be maintained by the management component 202 in order to facilitate control over various resources of the workspace, including the drive units 220 moving therein. Control over the inventory system 200, including control to update the virtual representations therefor, can be conducted by a user at one or more control terminals 232, which can communicate with the management component 202 via the network 230, and which may be on-site, remote, or connected with one or more user workspaces 214.

The material handling grid 208 can include physical elements, locations and statuses of which can also be maintained by the virtual representation of the material handling grid. For example, the inventory system 200 can include various physical elements in the material handling grid 208 such as, but not limited to, user workspaces 214, which define regions in which human workers can perform tasks and manipulate equipment, automated inventory handling robotics 216, which can include any suitable form of robotic handling arm, lift, vertical storage apparatus, or the like; and stations relating to drive units such as charging stations 218. The foregoing is not an exhaustive list of physical elements which may be used in an inventory system 200. Aspects of such physical elements can be tracked in the virtual representation of the material handling grid 208. Suitable aspects can include locations, physical attributes such as whether such physical elements can be tunneled under by drive units, and status attributes such as whether such physical elements are currently handling or storing inventory, currently active or inactive, currently in use or waiting, or other suitable status attributes.

The virtual representation of the workspace can designate certain of the positions 210 for tasks. Thus, the positions 210 in the material handling grid 208 are defined not only by location, but also by a set of rules for each location. For example, subsets of positions 210 in the material handling grid 208 may be designated for transportation of inventory holders 212 by drive units 220, as denoted by 'X' markings, while other subsets of the positions may be designated for storage of inventory holders, as denoted by 'O' markings. The arrangement of these designations in the virtual representation of the workspace will tend to create systems of pathways within the inventory system, e.g., regions designated for transportation of inventory holders can be aligned to provide direct paths for the removal or return of inventory holders between storage regions and periphery stations around the material handling grid 208, while regions designated for storage of inventory holders can provide paths for the outbound transit of empty drive units 234 to retrieve inventory holders, and the like.

The system 200 can also generate designations for special regions 222, e.g., regions with specific rules for drive units 220. Special regions may be designated for accommodating workflow of unmanned drive units 220, for reducing congestion, or for bringing drive units within working distances of physical elements like the user workspaces 214 and/or automated inventory handling robotics 216. For example, the system 200 may designate specific locations for receiving drive units 220 within or adjacent to various system resources; and may restrict access by drive units to certain locations. For example, some locations may be removed as drive-unit accessible locations due to overlap with some physical structure of the station; or some locations may be height-restricted, thus allowing clearance therethrough by empty drive units or drive units carrying only certain forms of inventory holders and not others. Also by way of example, in some embodiments, the flow of drive units 220 through certain spaces may be managed to create specific traffic patterns that better manage the volume of movement, e.g. by designating some regions for one-way travel by drive units 220, particularly near resources to which many drive units are tasked with moving inventory; by designating "queues" for accessing certain resources or locations; by limiting right-of-way and access around inventory holders to create pathways for rapid movement; or other limits to address traffic issues that may arise during operation.

Figure 2:
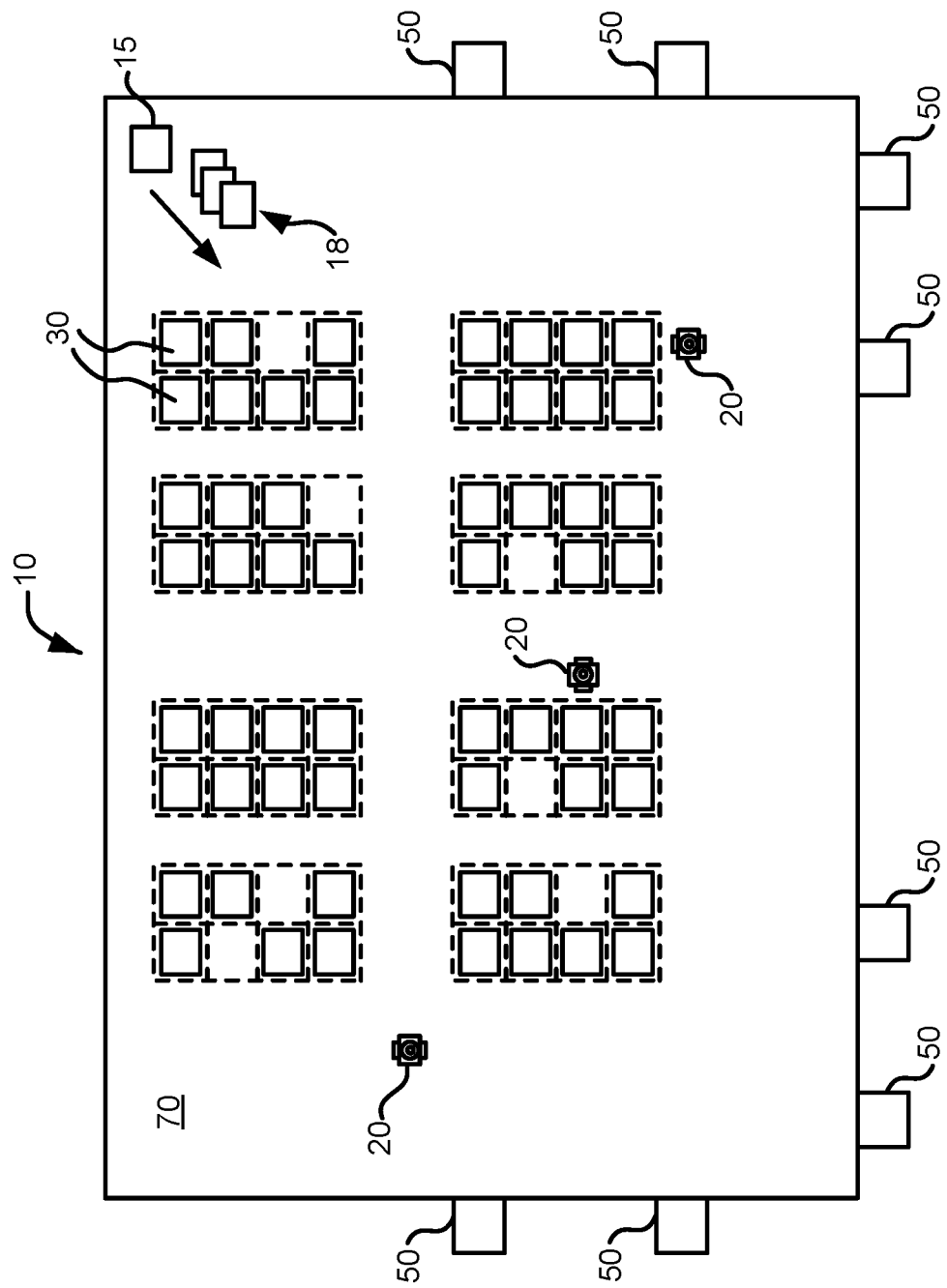
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
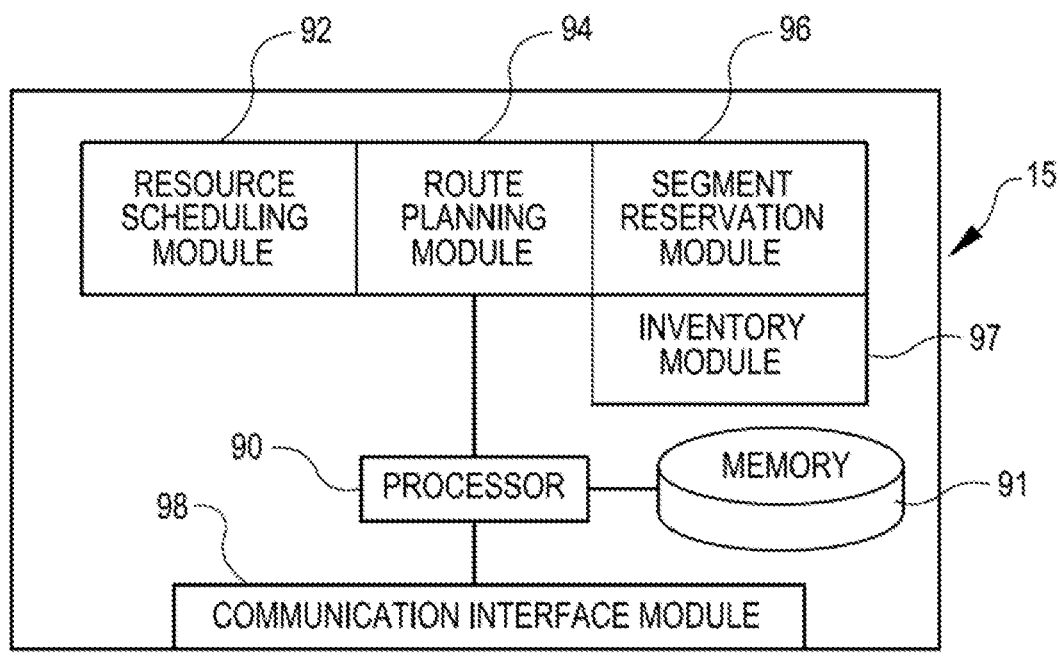
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path.

After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
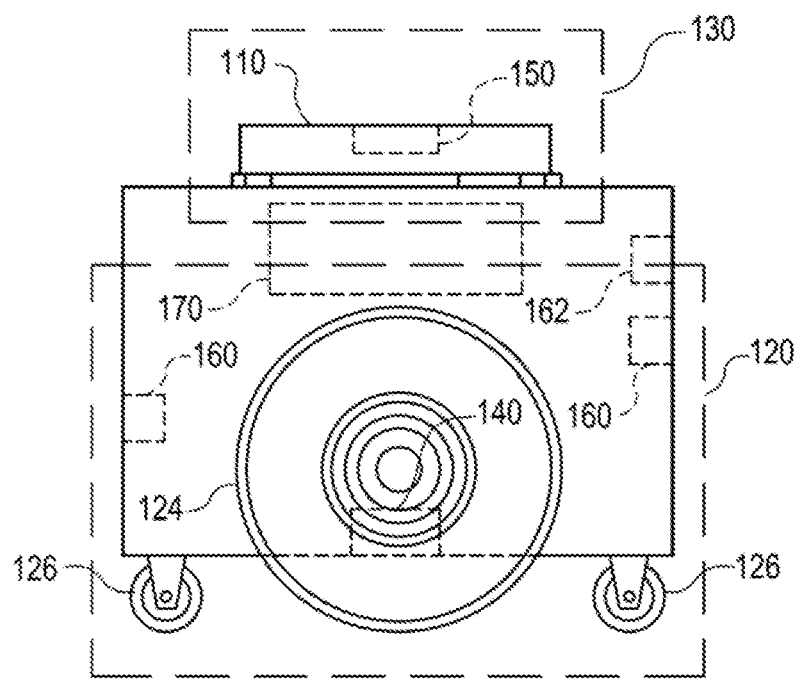
FIGS. 4 and 5 illustrate in greater detail an example mobile drive unit that may be utilized in particular embodiments of the inventory system shown in FIG. 2.
Figure 5:
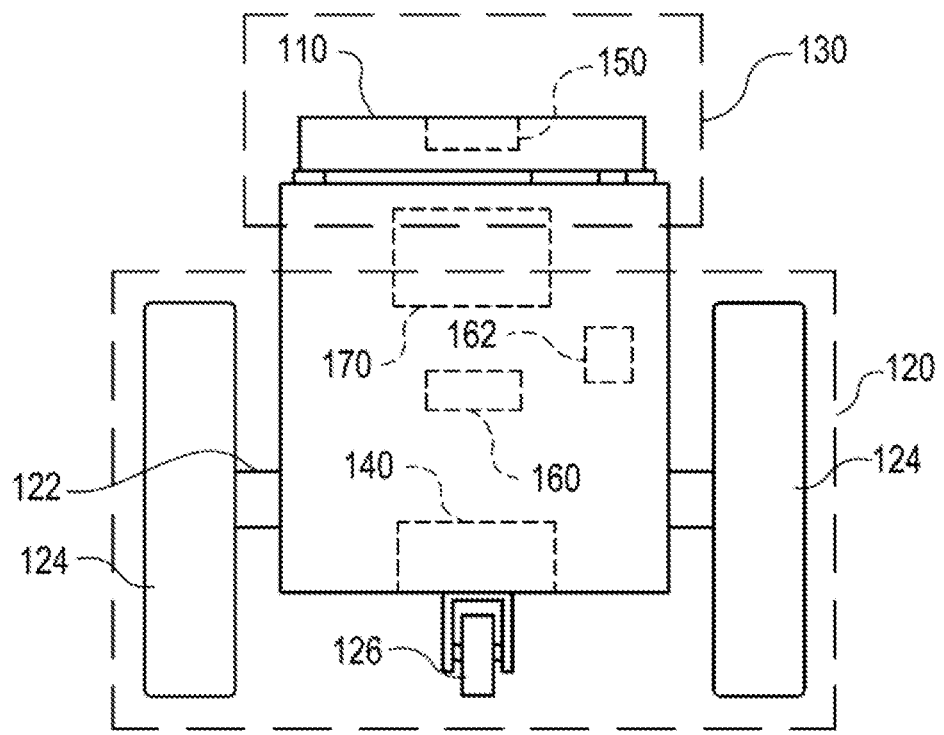

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
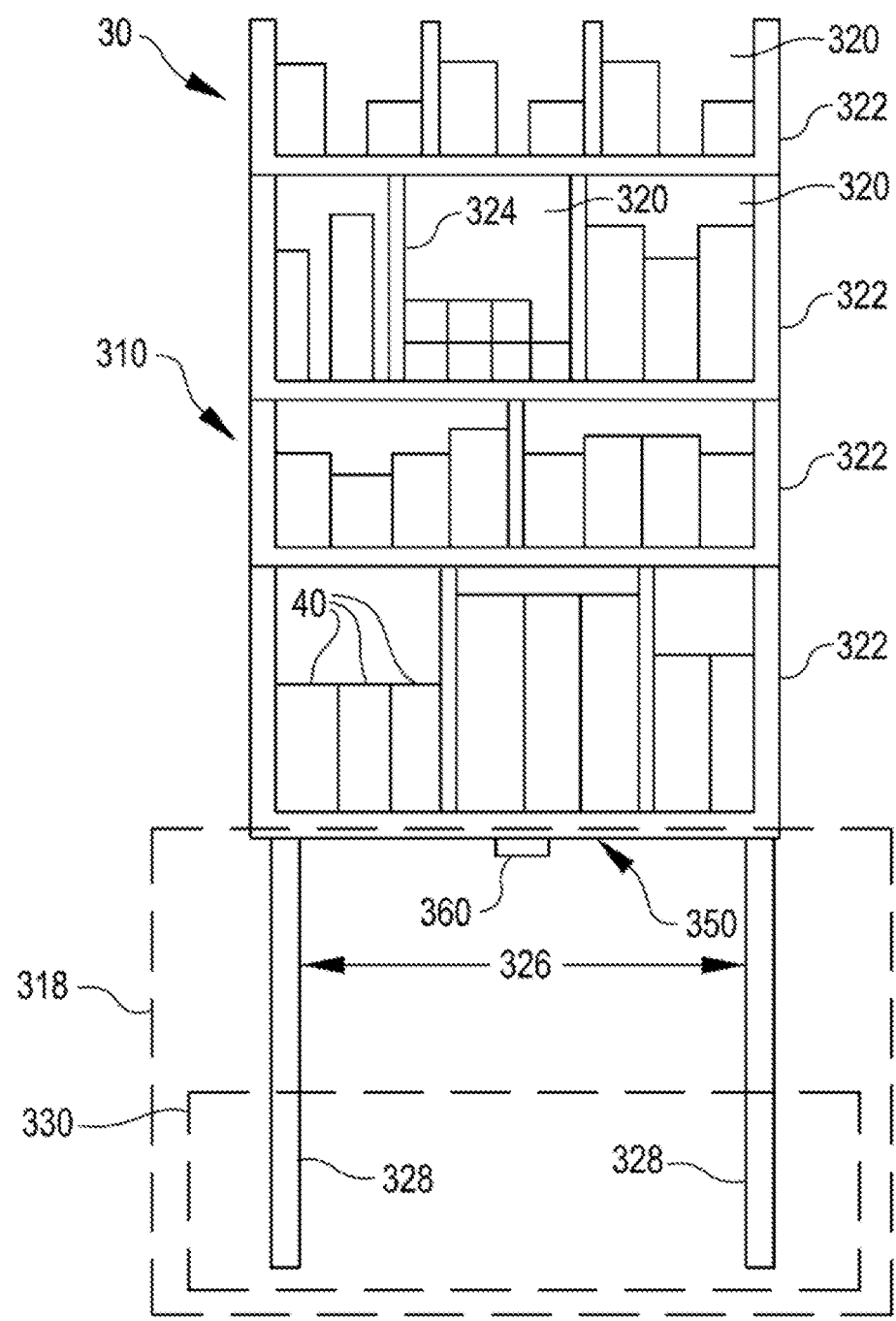
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to inventory systems that can employ inventory holders, drive units for moving the inventory holders, and robotic systems for handling inventory in conjunction with a virtual inventory system that monitors and controls the positions and activities of components of the inventory system. As is apparent from the above, such systems are almost infinitely expandable and customizable. Additional space for storage and/or sorting of inventory can be added by expanding the available space in a material handling grid; and the sorting and other material handling capabilities can be expanded by adding new equipment, such as automated inventory handling robotics, by adding new workspaces, or by adding additional drive units.

In accordance with embodiments, additions of new resources to a material handling grid can be handled by updating a virtual representation of the material handling grid to include the new resources. Specifically, according to at least one embodiment, updates can be handled without pausing system operation, and with minimal disruption to ongoing operation. Such methods can be achieved by managing a portion of the inventory system, and partially implementing the change to the inventory system by deploying an intermediate state of the virtual representation of the inventory system. When the operation of the inventory system has fully adapted to the change (i.e., when a new region has passed an inspection, when a region to be removed from the inventory handling has been successfully removed, etc.) the system can fully implement the update to the virtual representation by replacing the intermediate state of the virtual representation with the final state.

As inventory systems evolve and utilize more complex equipment, the balance of centralized and decentralized control over the various inventory system resources is tending toward decentralization. In some embodiments, control over the activities of drive units, automated inventory handling robotics, and even oversight of user workstations can be controlled by a collection of software services coordinated by a management component. In some embodiments, the collection of software services, or 'clients,' can be operated remotely on any suitable number of servers, i.e. in a distributed network or cloud-based system. Alternatively, in some embodiments, any number of software services that control an inventory system can be run on computing hardware directly associated with the management component. An example of one embodiment of a suitable inventory system is described below with reference to FIG. 7, as well as several example processes for distributing updates to a virtual representation of a material handling grid with reference to FIGS. 8-14.

Figure 7:
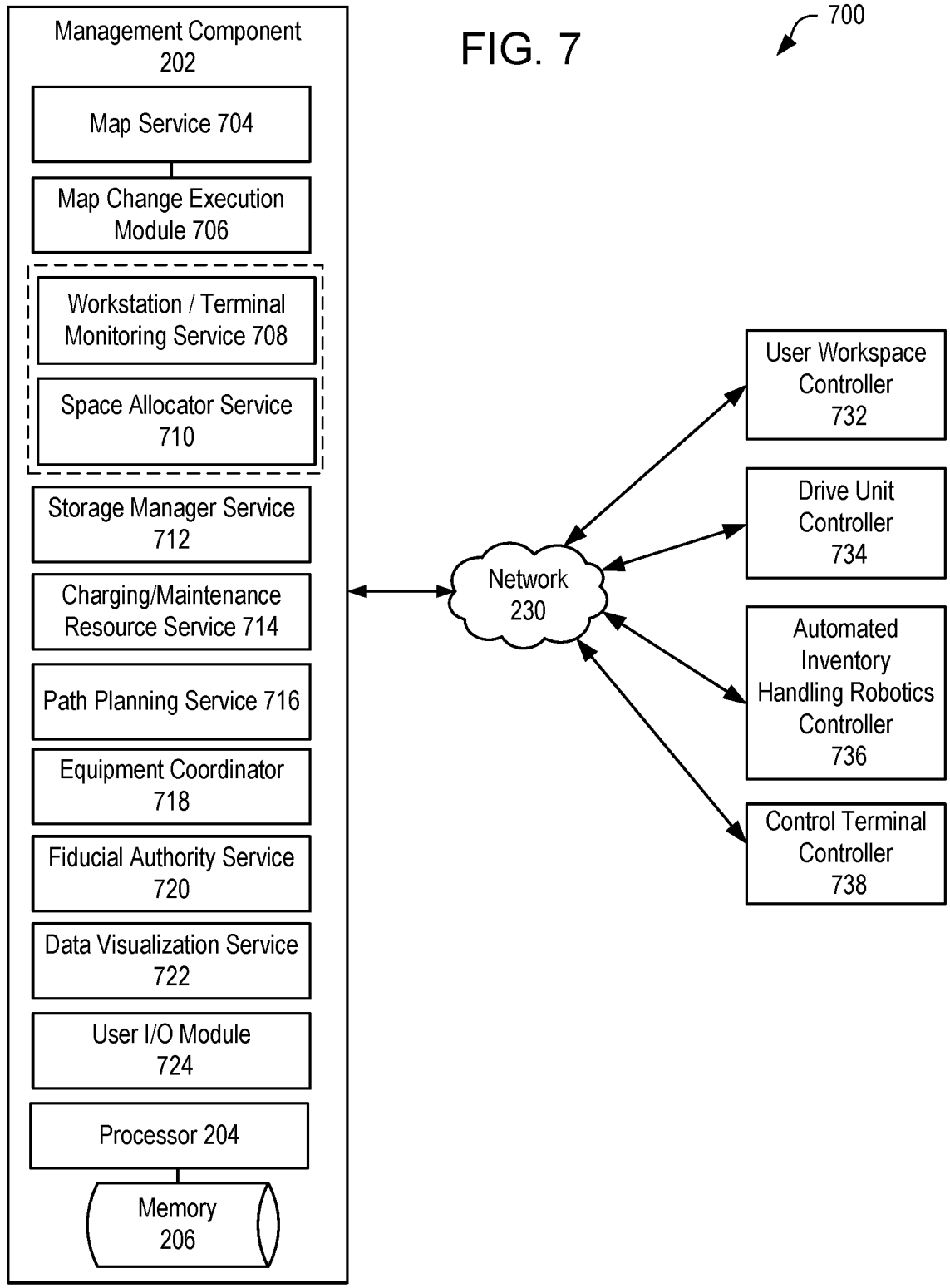
FIG. 7 is a simplified block diagram illustrating an example control system that can be used in the inventory system of FIG. 1.

FIG. 7 is a simplified block diagram illustrating an example control system 700 that can be used in the inventory system 200 of FIG. 1. The system 700 may be operable to control any suitable number of drive units 234/20 for transporting inventory holders 212/30 (FIGS. 1, 2), to control any suitable number of inventory system resources, (e.g., automated inventory handling robotics 236) as well as other system elements.

For example, the system 700 includes a management component 202, as described above with reference to FIG. 1, including a processing module 204 and memory 206 operable to maintain any, or all of, or any suitable combination of the following modules. As discussed above, any suitable number of the following modules may also be distributed, e.g. in a cloud-based architecture. The management component 202 may communicate with any distributed components, or with controllers for physical components of the inventory system, via a network 230, which may be any suitable type of wired and/or wireless network. Modules, or client services, for managing operations in an exemplary inventory system can include some or all, or any suitable subset of, the following: A map service 704 can be maintained for monitoring and/or maintaining information about the existing virtual representations, including the map or maps corresponding to various zones in an inventory system or material handling grid. The map service 704 is generally available to respond to requests from other client services for details concerning the map, such as but not limited to a grid size, locations of fiducial markings, restrictions on specific locations, and the like. A map proxy service 706 can control interactions between the map service 704 and some or all client services, e.g. during a deployment process. Certain client services may be designated as critical services for purposes of map deployment, meaning that a negative response or failure to receive a response from these client services can be sufficient to delay or prevent deployment of a map update. Critical services can include, but are not necessarily limited to, a monitoring service 708 for monitoring and controlling access to user-operated workstations and terminals, and/or a space allocator service 710 for allocating space to drive units for movement. The workstation and/or user terminal monitoring service 708 can detect whether user-operated workstations and/or terminals are active or logged in, and can initiate a suspension or temporary logout of said workstations and/or terminals at the direction of the management component 202. The space allocator service 710, which is responsible generally for allocating space to drive units for movement, is also responsible for maintaining location information of the drive units, and for preventing collisions between drive units. For example, the space allocator service 710 can detect where a drive unit is positioned and where it is traveling, and can grant space in the material handling grid for transit by the drive unit prior to each movement. The space allocator service 710 can similarly handle allocation of space for inventory holders, and can retain records of available space based on aspects of the existing map, such as positions of obstructions, special zones, robotic inventory handlers, user workstations, and the like.

Additional modules or client services for managing operations in an inventory system can be prepared to accept updates to the virtual representations of the workspace, but are generally not granted authority to delay or prevent a map update. Some of these additional modules or client services can include the following: A storage manager service 712 can track storage locations in the material handling grid. The storage manager service 712 can determine, from updated map data, the locations available for storage of inventory holders, as well as what locations may have been converted from storage to pathways or vice-versa, in order to queue requests for drive units to move inventory holders to appropriate locations. A drive unit charging/maintenance resource service 714 can maintain locations of charging stations, repair stations, and/or storage locations for drive units, in order to provide drive unit controllers with information about the status and positions of relevant resources for managing drive units. A path planning service 716 is generally responsible for performing route planning functions for determining paths for drive units to transit the material handling grid, with and without inventory holders; and uses map data to determine the location of available paths or obstructions. An equipment coordinator 718 can be used to coordinate with individual drive unit controllers to perform coordinated action of drive units, e.g. pausing the motion of drive units to implement the map update processes. A fiducial authority service 720 can maintain information about fiducial markings and their positions in the material handling grid, in particular managing which fiducial markings are present in a particular map. The fiducial authority service 720 updates a record of fiducial locations and their respective machine-readable indicia, as well as other information such as fiducial offsets. A data visualization service 722 can be used to generate a visible representation, e.g. for presentation to a user, of the various components of a virtual representation of the material handling grid; and a user I/O module 724 can be used to display said visible representation to an administrator or user, and to receive commands related thereto, e.g. commands to initiate a map update, or commands concerning the specific attributes of the map update.

In various embodiments, any or all of, or any subset of, the services described above with respect to management component 202 may communicate with local controllers in an inventory system, e.g. via the network 230, to control operation of inventory system resources. For example, local controllers for system resources can include, but are not limited to, a user workspace controller 732, a drive unit controller 734, automated inventory handling robotics controller 736, and terminal controller 738. In accordance with various embodiments, the user workspace controller 732 corresponds with one or more user workspaces or terminals like user workspace 232 (FIG. 1). The drive unit controller 734 is operable to direct movement of one or more drive units in an inventory system, e.g. drive unit 234 (FIG. 1), in conjunction with instructions from the management component 202 and/or related modules, e.g. the drive unit resource service 716 and path planning service 716. The controller 736 for automated inventory handling robotics is operable to direct movement and tasks by one or more automated inventory handling robotics stations 236 (FIG. 1), which can include lifts, sorting stations, loading and unloading stations for moving inventory between containers, inventory holders, and/or conveyances, or the like. Likewise, the control terminal controller 738 can communicate user instructions from a control terminal 238 (FIG. 1) and/or relay reports, such as error reports or status reports, from the management component 202 to a user.

At least one embodiment of the present disclosure is directed to a method and system for implementing an update to a virtual representation of a workspace in an inventory system without system downtime and while mitigating system disruption. According to one example, a material handling grid of an inventory system can be updated by adding and removing active space to the material handling grid, including adding and removing physical components in addition to adding and removing virtual designations for locations corresponding to fiducial markings.

FIGS. 8-10 are simplified schematic diagrams illustrating a first example of an update to a virtual representation of a workspace as applied to the inventory system of FIG. 1. Aspects of this example may be performed in conjunction with any other operations as discussed herein or in alternative orders without deviating from the spirit of this disclosure. Generally, the implementation described in FIGS. 8-10 relates to methods of utilizing area management in an inventory management grid in conjunction with the nondisruptive addition or subtraction of portions of the inventory management grid. Specific attributes of the methods employed in the example implementation of FIGS. 8-10 are described in more detail with reference to the process 1100 described in FIG. 11.

FIG. 8 is a simplified schematic diagram illustrating an initial configuration 208a of an inventory management grid corresponding to the inventory management grid 208 of the system 200 shown in FIG. 1 which has been prepared for an update. As shown, the initial configuration 208a of the virtual representation contains a portion of the visible workspace, with an area to be added 240 shown outside the initial area. The initial configuration 208a includes various active elements, including drive units 220 and inventory holders 212; and various stationary, physical elements such as user workstations 214, inventory handling robotic stations 216, and drive unit chargers 218. The inventory management grid of the initial configuration 208a is defined by a plurality of positions 210 in the physical system. Each such position 210 can be associated with specific rules or designations in the corresponding virtual representation of this initial area, including positions for transit and storage ('X' and 'O' markings, respectively), and special regions 222 defined by specific rules, e.g., queues, high-traffic zones, and the like.

Prior to an update, the region to be added 240 can be prepared for inclusion in the inventory management grid. This preparation can include the addition of fiducial markings throughout to be used upon deployment of the new virtual representation of the workspace. In addition, or alternatively, preparation can include the addition of physical elements, such as new user workstations 214 or new charging stations 218, as well as any other suitable resource. Such new resources are typically inactive from installation until the deployment of an inclusive virtual representation, i.e., the components that are added to the inventory management grid are prepared in advance of the update, but not activated until all such components are prepared and the components and new space have been inspected and confirmed as complete.

When the update is initiated, the region to be added 240 is added to the initial configuration 208a of the virtual representation to form an intermediate configuration 208b that includes areas and resources of the initial region and the area or areas of the region added. The update can include more than just incorporating additional floor space. As shown, the newly added portion forming the intermediate configuration 208b can also include physical resources (e.g. workspace 214, charging station 218, or other resources), fiducial markings that extend the machine-navigable material handling grid. Physical locations on the material handling grid 208 can be delineated by fiducial markings, and correspond to potentially many restrictions and uses, e.g. as special regions 222 or as regions specified for transit or storage of inventory via drive units 220 and the like. Thus, updates to the configuration of the virtual representation can update the instructions sets corresponding to the locations defined by the fiducial markings.

According to some embodiments, the region to be added 240 can be subjected to an initial screening or inspection, e.g., where a drive unit 220 or similar machine scans the fiducial markings of the region to be added as an inspection to confirm the correct placement of these elements. The addition of the region to be added 240 can be done without disrupting the normal operation of the inventory system, as no changes have been made to the initial configuration 208a.

In some embodiments, the added region 240 can be subjected to a period of temporary management, i.e. inspection and validation, during which special rules can apply to the added region. For example, in one embodiment, the added region is inspected by unmanned drive units (e.g. drive units 220, FIG. 1) that confirm positions of fiducial markings therein. Similarly, locations of physical resources can also be confirmed autonomously, or can be confirmed by inspection and receipt of confirmation from a user.

In some embodiments, e.g. where the update to the inventory system involves only adding floors space and resources to an inventory management system, the transition described with reference to FIG. 8 can be the update. However, the system can also accommodate more complex transitions that include the removal of regions of the material handling grid, or the removal of physical resources.

FIG. 9 is a simplified schematic diagram illustrating a transition whereby the system, operating with the intermediate configuration 208b moves inventory and resources to vacate a region to be removed by creating a second intermediate configuration 208c that includes a managed area 242 coinciding with the area or resources to be vacated. Here, the intermediate configuration 208b is modified while minimizing disruption to the system and to ongoing tasks by managing activity within the region to be removed. In one embodiment, management entails prompting the gradual removal of material from the region by implementing one or more removal policies. For example, one such policy is an exclusion policy, whereby the system prevents drive units 220 from moving inventory holders 212 into the managed area 242. Such an exclusion policy may alternatively operate by preventing the system from assigning new inventory storage tasks that include destination locations within the managed area 242, or by preventing the system from seeing locations within the managed area as candidate locations for the placement of inventory. Under any one of these example policies, as inventory is called for sorting, the inventory holders in the managed area 242 are gradually removed and then placed in unmanaged portions of the inventory system, causing the diminution of inventory in the managed area. Another such policy is a preferential removal policy, where the system prioritizes the retrieval of inventory items from the managed area 242 over inventory items elsewhere. Yet another such policy is a direct removal policy, where the system can generate requests to drive units 220 to remove inventory holders 212 from the managed area 242 and move them to unmanaged portions of the intermediate virtual representation 242.

The above policies and similar policies can be enacted in any suitable combination with one another, and may be performed sequentially, depending on the desired rate of transition and the allowed degree of disruption to system operations. For example, the use of an exclusion policy is relatively nondisruptive compared to a direct removal policy, resulting in minimal loss of efficiency. In some embodiments, the system can add the use of a preferential removal policy and/or direct removal policy to encourage the removal of inventory holders 212 in the managed area 242 as the number of inventory holders 212 in the managed area decreases and as the rate of removal of those inventory holders gradually diminishes. In accordance with one embodiment, the use of a managed area 242 can work in combination with reassigning the roles of positions within the managed area, e.g., by changing the assignments of locations in the managed area, as denoted by positions 210, from storage locations (denoted 'O') to travel locations (denoted 'X'). In some embodiments, physical resources in the managed area 242 can also be deactivated during, or in some cases after, the transition and removal of inventory and drive units therefrom.

FIG. 10 is a simplified schematic diagram illustrating a final step of a transition that removes area from the second intermediate configuration 208c shown in FIG. 9. When the system determines that the managed area 242 has been vacated and that no remaining inventory holders, drive units, or other portable resources remain within the managed area, the system can remove the managed area from the material handling grid by updating the second intermediate configuration 208c to the final configuration 208d. Upon completion, the previously managed area 242 is no longer part of the material handling grid, and can be accessed readily for the removal of deactivated physical resources, e.g. workstation 214. In embodiments where the update to the inventory system involves only removing floor space and resources from an inventory management system, the transition described with reference to FIGS. 9-10 can describe the update. However, in total, FIGS. 8-10 generally describe a complex update process where floor space is both added and removed, i.e., where the material handling grid is "moved." Specific process steps that correspond with the implementations described in FIGS. 8-10 are listed below with reference to FIG. 11.

Figure 11:
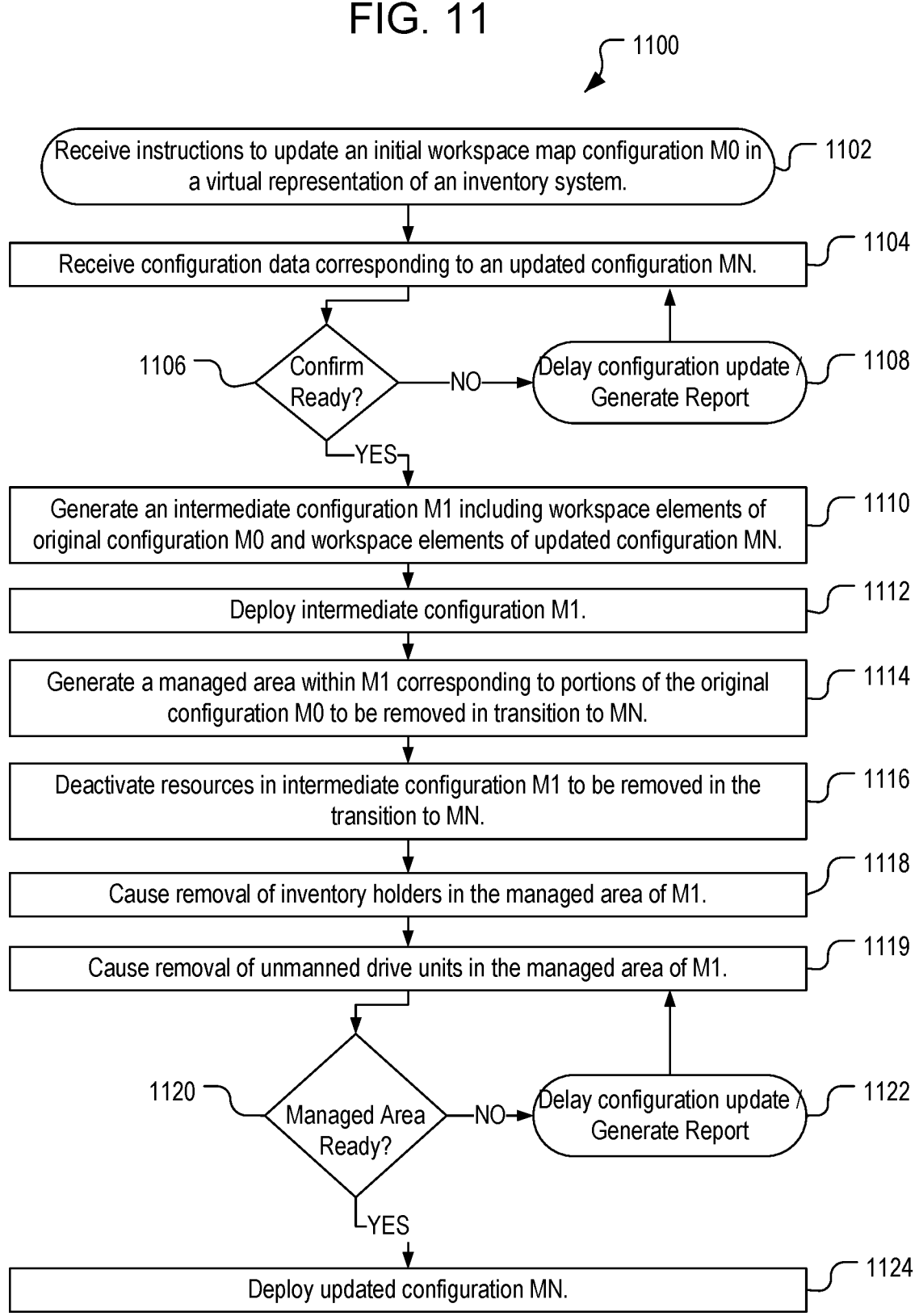
FIG. 11 illustrates a first example process for implementing an update to a virtual representation of a workspace that can be used in the inventory system of FIG. 1.

FIG. 11 illustrates a first example process for implementing an update to a virtual representation of a workspace and/or to a material handling grid that can be used in conjunction with an inventory system, like the inventory system 200 of FIG. 1. Some or all of the process 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Aspects of the process 1100 may be performed, in some embodiments, by a similar system to the system 700 discussed with reference to FIG. 7. The system may be implemented in an inventory system as described in FIG. 1 or 2, and may be used to manage nondisruptive inventory system updates as described above with reference to FIGS. 8-10. The system may also be implemented in conjunction with a distributed control architecture, i.e. an architecture in which the various components of the management component (e.g. management component 202, FIG. 7) are maintained across one or more, potentially many servers which may be offsite or cloud-based.

In accordance with embodiments of the present disclosure, the system can receive instructions to update a virtual representation of an inventory system, i.e. to update an initial workspace map configuration M0 to an updated, final workspace configuration MN (act 1102). When the physical resources and navigational elements (i.e. fiducial markings) are prepared at the physical material handling grid, the system can receive the updated configuration data and instructions to initiate the transition (1104), as well as confirmation that the added portions of the configuration are ready (act 1106). If confirmation fails, e.g. if an element of the added portions fails an inspection process, the system can delay the configuration update and wait for new configuration data or new instructions to implement the configuration update.

If the added portions of the configuration are confirmed ready, the system can generate an intermediate configuration M1 that includes both the initial workspace resources and area of the initial configuration M0 along with the added workspace resources and area (act 1110). Thus, the intermediate configuration M1 corresponds to the area of the initial workspace configuration M0, plus any added area in MN which did not appear in M0. M1 can be larger than MN, as it still includes areas which are present in M0 but not in MN. Then the system can deploy the intermediate configuration M1 (act 1112), after which the system will begin to use the intermediate configuration for managing inventory tasks, like moving, sorting, retrieving, and storing inventory. In some embodiments, the inspection process can occur after the intermediate configuration M1 has been deployed, by managing any added areas until after the completion of an inspection of the added areas, e.g. automated or partially automated inspection of fiducial markings by drive units.

The process 1100 can also include subsequent removal of regions from the initial configuration M0 in the virtual representation. When removing space from the virtual representation, the system generates a managed area corresponding to the portions to be removed (act 1114). In process 1100, this removal step is described relative to the intermediate configuration M1 after an initial addition of area or elements from M0 to M1. However, a removal step can also be conducted to reduce the initial configuration M0 without previously adding space or resources. The system can then generate instructions to prepare the space within the managed area for removal. This preparation can include the deactivation of system resources within the managed area of the intermediate configuration M1 (act 1116), and removal of inventory from the managed area (act 1118), e.g. by preventing the ingress of inventory into the managed area, by preferentially retrieving inventory form within the managed area, or by direct removal of inventory from the managed area by unmanned drive units or other system resources. The system can also generate instructions to clear the managed area of drive units (act 1119), e.g. by generating instructions to prevent drive units from entering the managed area and/or instructions that cause the drive units to exit the managed area. In some embodiments, the removal of drive units from the managed area may performed after the system has confirmed that all inventory, and in particular inventory holders or containers configured for transit by drive units, have already been removed from the managed area.

The system can detect whether the managed area is ready for removal (act 1120), e.g., by determining whether remaining active resources such as drive units remain in the managed area, or whether any inventory or inventory holders remain in the managed area. If the managed area is not yet ready for removal, the system can delay the update to the virtual representation (act 1122) and may generate an error report for presentation to a user. When the managed area is ready for removal, the system can proceed to deploy the final workspace configuration MN (act 1124).

The implementation of FIGS. 8-10 and the process of FIG. 11 describe systems and methods for implementing an update to a virtual representation in an inventory system, i.e. an update to an inventory system configuration, which entails adding a region and then later subtracting a region, along with concomitant physical resources and designations for positions in the material handling grid. These processes can be implemented without deactivating the inventory system and while minimizing disruption to inventory system tasks. However, as discussed above, updates to the virtual representation of an inventory system may be performed out of order (e.g. by first removing space, then later adding space). By way of example, FIGS. 12-13 illustrate an example implementation of the techniques described herein to enable the removal of a physical resource from a material handling grid without halting the operation of the system by first removing and then reinstating a region of a material handling grid.

Figure 12:
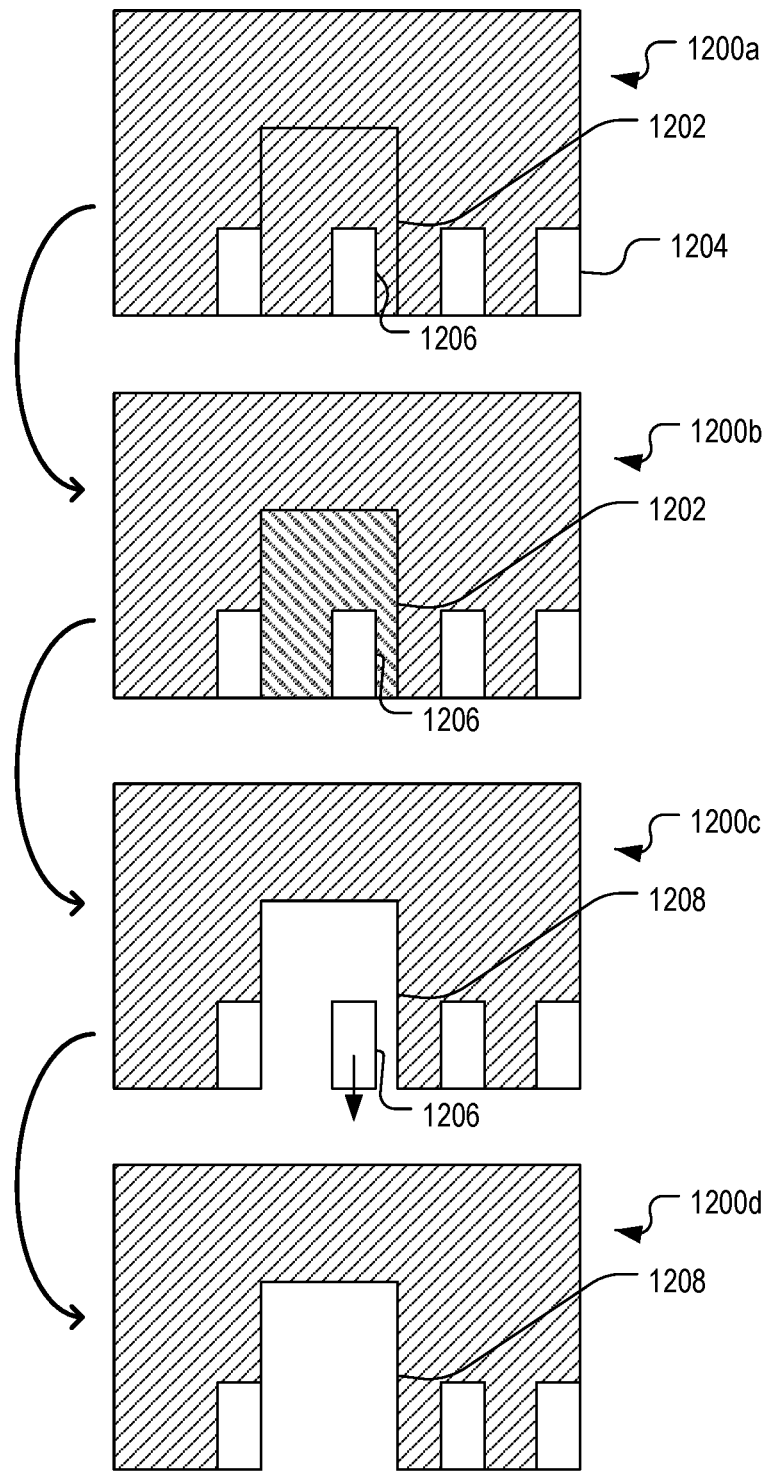
FIGS. 12-13 are simplified schematic diagrams illustrating a second example of an update to a virtual representation of a workspace as applied in a general case, and applicable to the inventory system of FIG. 1.
Figure 13:
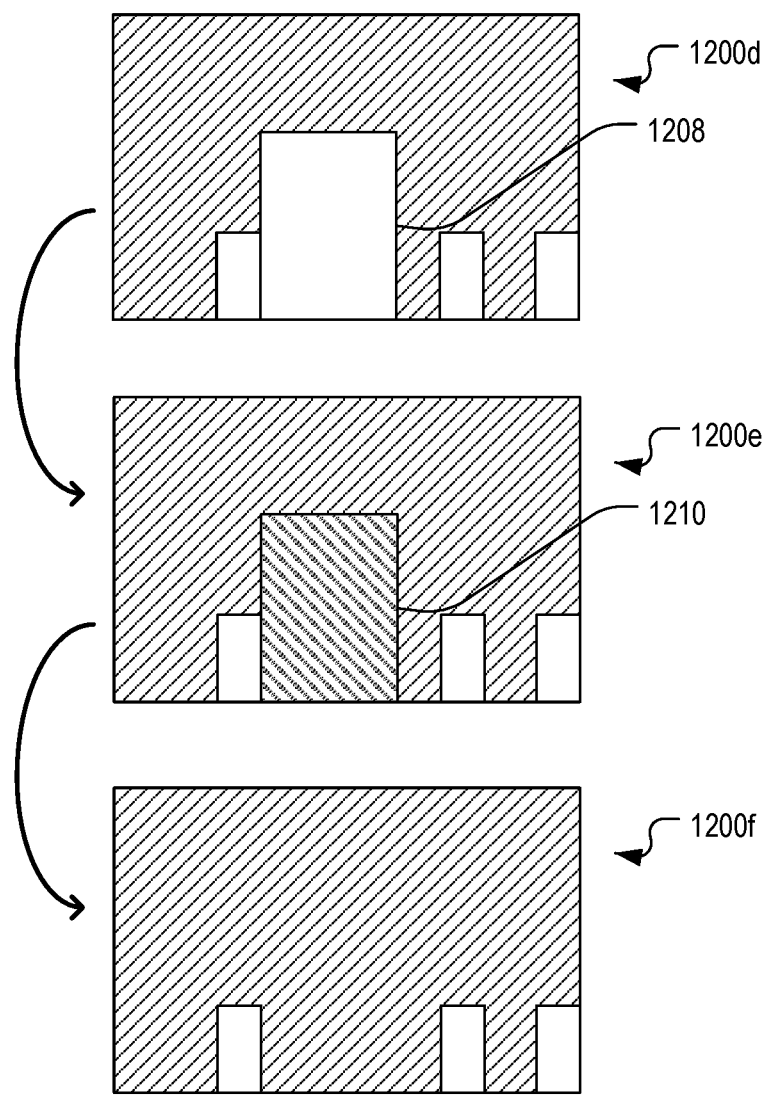

FIGS. 12-13 are simplified schematic diagrams illustrating a second example of an update to a virtual representation of a workspace as applied in a general case, and applicable to the inventory system of FIG. 1. In FIG. 12, an initial configuration 1200a is shown representing an initial configuration of a material handling grid containing multiple physical resources 1204 and a target resource 1206 for removal. In the initial configuration 1200a, a first managed area 1202 is identified around the target resource 1206. In a second configuration 1200b, the system manages inventory operations to prepare the managed area 1202 for removal as described above. Once the area 1202 is ready for removal, i.e., once the inventory and inventory processing resources such as drive units have been removed from the area, the system can deploy an intermediate configuration defining a third configuration 1200c which surrounds a removed area 1208 corresponding to the first managed area 1202. With the target resource 1206 no longer within an active configuration of the workspace, the resource can be removed without interrupting ongoing processes in the inventory system, as shown in the fourth configuration 1200d.

FIG. 13 illustrates the addition of an area into the virtual representation of the workspace. In some cases, the system confirms that the removed area 1208 is ready to add to the virtual representation before generating a new intermediate configuration. As discussed above with reference to FIGS. 8-10 and 11, this confirmation step can include inspecting the area, receiving user confirmation that the area is in condition for addition to the workspace configuration, or other suitable criteria. As shown in a fifth configuration 1200e, the system can also, or alternatively, add the new area to the configuration as a second managed area 1210 as shown in configuration 1200e. Managing this added portion can include performing an inspection process, preferentially directing inventory, or other tasks until the second managed area 1210 can be fully integrated into the final configuration of the virtual representation of the workspace, shown as configuration 1200f.

Figure 14:
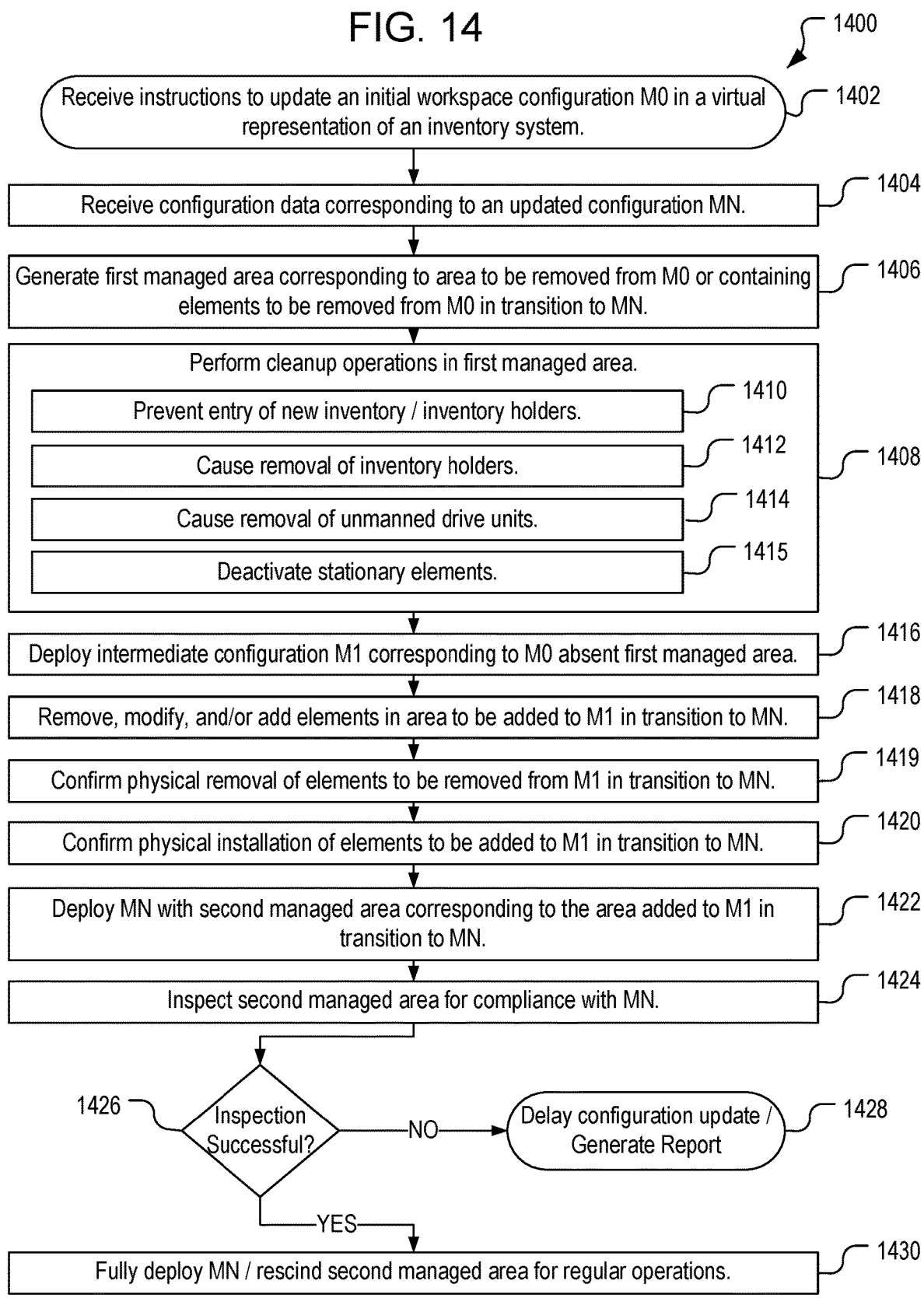
FIG. 14 illustrates a second example process for implementing an update to a virtual representation of a workspace that can be used in an inventory system similar to the inventory system of FIG. 1.

Specific process steps for removing and adding resources or area to the virtual representation of a workspace as described in FIGS. 12-13 are described below with reference to FIG. 14. FIG. 14 illustrates a second example process 1400 for implementing an update to a virtual representation of a workspace that can be used in an inventory system similar to the inventory system of FIG. 1. Aspects of the process 1400 may be performed, in some embodiments, by a similar system to the system 700 discussed with reference to FIG. 7. The system may be implemented in an inventory system as described in FIG. 1 or 2, and may be used to manage nondisruptive inventory system updates as described above with reference to FIGS. 8-10 and/or FIGS. 12-13. The system may also be implemented in conjunction with a distributed control architecture, i.e. an architecture in which the various components of the management component (e.g. management component 202, FIG. 7) are maintained across one or more, potentially many servers which may be offsite or cloud-based.

In accordance with embodiments of the present disclosure, the system can receive instructions to update a workspace configuration M0 in an inventory system (act 1402). The system can receive configuration data corresponding to an updated configuration, e.g. final configuration MN (act 1404) and, using the configuration data, generate a first managed area corresponding to an area to be removed from the original configuration M0. Where the system is being employed to remove physical resources from the workspace, the system can generate the first managed area to contain the resource to be removed (act 1406). The system can then generate instructions to carry out various cleanup operations in the first managed area (act 1408). Such cleanup operations can include, but are not limited to: preventing inventory or inventory holders from newly entering the managed area (act 1410), removing or facilitating the removal of inventory and inventory holders from the managed area (act 1412), removing or facilitating the removal of unmanned drive units from the managed area (act 1414), and/or deactivating system resources within the first managed area (act 1415). When the first managed area has passed the cleanup stage (e.g., passed an inspection, or reports that no inventory or active system resources remain therein), the system can then deploy an intermediate configuration M1 that includes the initial workspace configuration M0 without the removed area (act 1416).

New areas can be added to the intermediate workspace configuration M1. First, such elements can be physically added to the workspace in the region corresponding to the portion to be added in the virtual representation (act 1418). Prior to deploying the updated final configuration MN, the system can confirm the physical removal of any elements that were slated for removal from the area to be added to the intermediate workspace configuration M1 (act 1419). For example, the previous locations of removed workstations, recharging stations, or other components can be scanned and cleared to ensure compliance with the updated configuration MN; or the system can wait for a user prompt indicating that an inspection has taken place. Similarly, the system can confirm the physical addition of any new elements slated for addition to the area to be added to the intermediate workspace configuration (act 1420), e.g. by way of automated inspection, user confirmation, or other comparable method. In one example, the system can utilize these operations to deploy an updated workspace configuration that replaces system elements like a physical system resource (e.g., a charging station) with other features, like fiducial-enabled floorspace. In some embodiments, as an alternative to removal of all such physical elements slated for removal from the area to be added to the workspace, some or all such physical elements can be retained in place while enacting an exclusion rule around such elements in the updated configuration MN.

When the layout of physical elements and resources has been confirmed, the system can then deploy the final configuration MN including a second managed area that corresponds to the area added in transitioning from M1 to MN (act 1422). The system can inspect the added area by a variety of methods including automated inspection, e.g. by way of one or more drive units, or can wait for confirmation from a user (act 1424). If the inspection is unsuccessful or if the new area is otherwise unsuitable for addition to the intermediate configuration M1, the system can delay the configuration update and/or generate a report for presentation to a user (act 1428). If the inspection is successful, the system can fully deploy the updated configuration MN by rescinding the management of the added area and allowing regular operations therein (act 1430).

Figure 15:
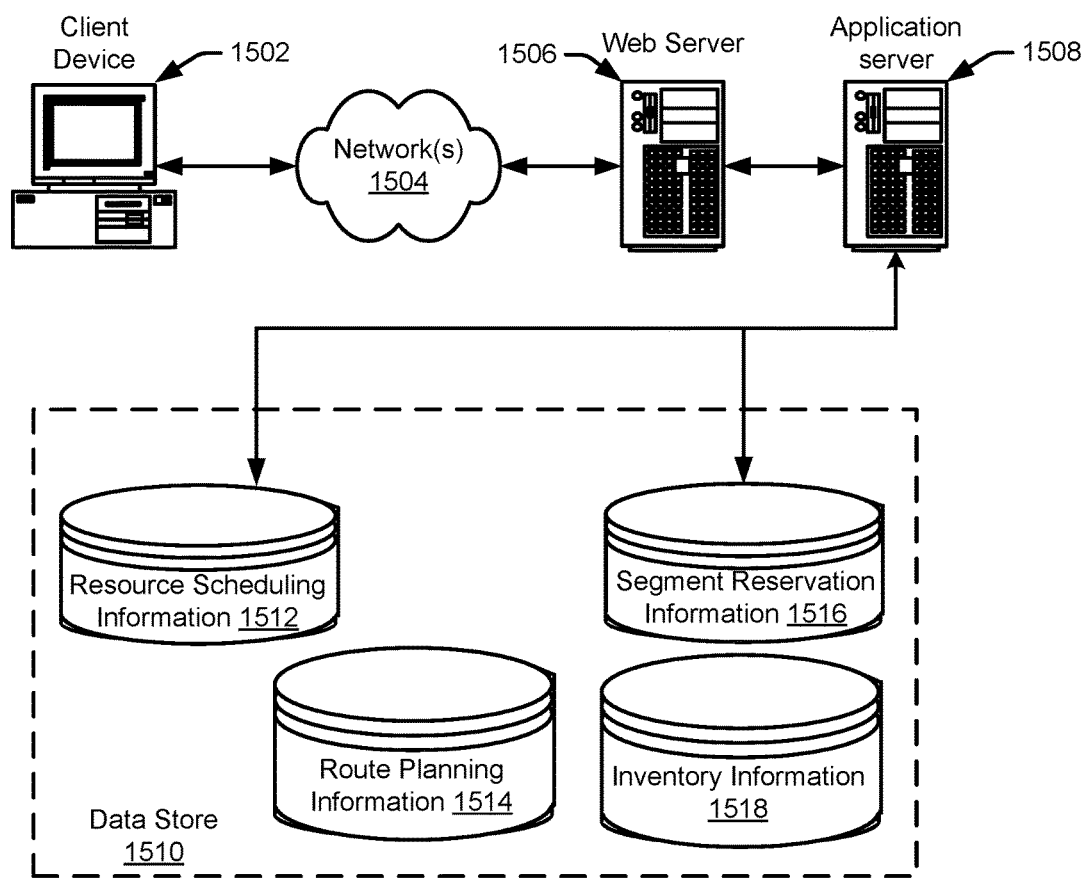
FIG. 15 illustrates an environment in which various features of the inventory system can be implemented, in accordance with at least one embodiment.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing information which can be used by modules described herein, such as resource scheduling information 1512, route planning information 1514, segment reservation information 1516, and/or inventory information 1518. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method of updating an inventory system, the method comprising:
   maintaining a record of positions of resources in the inventory system, including positions of inventory holders and unmanned drive units in a workspace, at least by storing a virtual representation of a drive unit navigable grid of the workspace, wherein the drive unit navigable grid is compatible with the inventory holders and unmanned drive units;
   receiving an instruction to update the virtual representation of the workspace from an initial configuration to a final configuration;
   determining a first additional area corresponding to an area of the final configuration that is excluded from the initial configuration;
   generating a first intermediate configuration that includes the initial configuration and the first additional area; and
   deploying the final configuration without suspending operations of the inventory system.

2. The method of claim 1, further comprising:
   determining a first removed area corresponding to an area of the initial configuration that is excluded in the final configuration;
   generating a second intermediate configuration that includes a managed area corresponding to the first removed area;
   causing one or more of the unmanned drive units to remove inventory holders from the managed area;
   receiving an indication that the managed area is in condition for removal from the virtual representation of the inventory system; and
   deploying the final configuration in response to receiving the indication that the managed area is in condition for removal from the virtual representation.

3. The method of claim 2, wherein receiving the indication that the managed area is in condition for removal further comprises determining that all unmanned drive units, inventory, and inventory holders in the managed area have been removed from the managed area.

4. The method of claim 2, wherein receiving the indication that the managed area is in condition for removal further comprises determining that a resource in the managed area has been removed.

5. The method of claim 2, wherein causing one or more of the unmanned drive units to remove inventory holders from the managed area further comprises implementing a removal policy that prevents ingress of inventory or inventory holders into the managed area.

6. The method of claim 2, wherein causing one or more of the unmanned drive units to remove inventory holders from the managed area further comprises implementing a policy that prioritizes retrieval of inventory holders in the managed area over inventory holders outside of the managed area for inventory retrieval tasks.

7. The method of claim 1, further comprising:
   receiving an indication that the first additional area is in condition for addition to the virtual representation of the inventory system; and
   deploying the final configuration in response to receiving the indication that the first additional area is in condition for addition to the virtual representation.

8. A method, comprising:
   maintaining a virtual representation of a drive-unit navigable grid of a workspace in a material handling system;
   maintaining modules operable to direct movement of unmanned drive units in the workspace, the modules including at least:
      a space allocator service module configured to maintain a record of positions of resources, including positions of inventory holders and unmanned drive units, within a virtual representation of the workspace; and a map service module operable to store the virtual representation of the workspace including a virtual representation of a drive-unit navigable grid;

receiving an instruction to update the virtual representation of the workspace from an initial configuration to a final configuration determining a first removed area corresponding to an area of the initial configuration that is excluded in the final configuration;

generating an intermediate configuration that includes a managed area corresponding to the first removed area;

receiving an indication that the managed area is in condition for removal from the virtual representation of the drive-unit navigable grid; and deploying the final configuration in response to receiving the indication that the managed area is in condition for removal from the virtual representation.

9. The method of claim 8, wherein the final configuration is deployed without halting operations of the unmanned drive units.

10. The method of claim 8, further comprising:
deploying the final configuration in response to determining that inventory and drive units have been removed from the managed area.

11. The method of claim 10, further comprising:
preventing the unmanned drive units from adding inventory to the managed area.

12. The method of claim 10, further comprising:
causing the unmanned drive units to preferentially retrieve inventory items from the managed area over inventory items from outside the managed area.

13. The method of claim 10, further comprising:
causing the unmanned drive units to retrieve inventory items from the managed area and place the inventory items outside of the managed area.

14. The method of claim 8, further comprising:
determining a first additional area corresponding to an area of the final configuration that is excluded from the initial configuration;
receiving an indication that the first additional area is in condition for addition to the virtual representation of the drive-unit navigable grid; and
deploying the final configuration in response to receiving the indication that the first additional area is in condition for addition to the virtual representation.

15. The method of claim 14, further comprising:
confirming a position of each of one or more fiducial markings in the first additional area; and
deploying the final configuration in response to successfully confirming the position of each of the one or more fiducial markings.

16. The method of claim 8, further comprising:
detecting one or more active resources in the managed area; and
disabling the one or more active resources in the managed area.

17. A computer readable storage medium containing computer-executable instructions that, when executed by a processor, cause the processor to perform operations, comprising:
maintaining a virtual representation of a drive-unit navigable grid;
receiving an instruction to update an initial configuration of the virtual representation of the drive-unit navigable grid to a final configuration;
determining a first removed area corresponding to an area of the initial configuration that is excluded in the final configuration;
deploying a first intermediate configuration that includes a managed area corresponding to the first removed area;
receiving an indication that inventory has been removed from the managed area; and
deploying the final configuration in response to receiving the indication that the inventory has been removed from the managed area.

18. The computer readable storage medium of claim 17, wherein the instructions further cause the processor to perform operations, comprising:
determining a first additional area corresponding to an area of the final configuration that is excluded from the initial configuration;
receiving an indication that one or more fiducial markings or resources present in the final configuration have been installed in the first additional area such that the first additional area can be added to the drive-unit navigable grid; and
deploying the final configuration in response to receiving the indication that the one or more fiducial markings have been installed.

19. The computer readable storage medium of claim 18, further comprising:
deploying a second intermediate configuration that includes the first additional area and the initial configuration prior to deploying the first intermediate configuration, wherein the first intermediate configuration includes the first additional area and the initial configuration excluding the first removed area.

20. The computer readable storage medium of claim 18, further comprising:
deploying a second intermediate configuration that includes the first additional area and the initial configuration after deploying the first intermediate configuration, wherein the second intermediate configuration includes the first additional area and the initial configuration excluding the first removed area.

* * * * *